(12) United States Patent
Lomax et al.

(10) Patent No.: US 7,981,821 B2
(45) Date of Patent: Jul. 19, 2011

(54) LOW SWELL, WATER VAPOUR PERMEABLE POLY(URETHANE-UREA)S

(75) Inventors: George Robert Lomax, Lancashire (GB); Noel Thomas Eggington, Lancashire (GB); Rosemary Danes, Lancashire (GB)

(73) Assignee: Baxenden Chemicals Limited, Lancashire (GB)

( * ) Notice: Subject to any disclaimer, the term of this patent is extended or adjusted under 35 U.S.C. 154(b) by 1002 days.

(21) Appl. No.: 11/795,200

(22) PCT Filed: Jan. 11, 2006

(86) PCT No.: PCT/GB2006/000076
§ 371 (c)(1),
(2), (4) Date: Aug. 1, 2007

(87) PCT Pub. No.: WO2006/075144
PCT Pub. Date: Jul. 20, 2006

(65) Prior Publication Data
US 2008/0102314 A1    May 1, 2008

(30) Foreign Application Priority Data
Jan. 14, 2005  (GB) ................... 0500764.6

(51) Int. Cl.
*B32B 5/02* (2006.01)
*B32B 27/36* (2006.01)
(52) U.S. Cl. ............. 442/85; 442/86; 442/394; 428/913
(58) Field of Classification Search .................. 442/394, 442/85, 86
See application file for complete search history.

(56) References Cited

U.S. PATENT DOCUMENTS

| | | | |
|---|---|---|---|
| 4,728,542 A | 3/1988 | Nachtkamp et al. | |
| 5,061,777 A | 10/1991 | Yoda et al. | |
| 5,120,813 A * | 6/1992 | Ward, Jr. | 528/28 |
| 5,239,036 A | 8/1993 | Krishnan | |
| 5,521,273 A | 5/1996 | Yilgor et al. | |
| 5,589,563 A | 12/1996 | Ward et al. | |
| 5,756,632 A | 5/1998 | Ward et al. | |
| 5,843,357 A | 12/1998 | Seneker et al. | |
| 2002/0028901 A1 | 3/2002 | Gunatillake et al. | |
| 2004/0087739 A1 | 5/2004 | Onder | |

FOREIGN PATENT DOCUMENTS

| | | |
|---|---|---|
| EP | 0348105 | 12/1989 |
| EP | 0371736 | 6/1990 |
| EP | 0534295 | 3/1993 |
| EP | 0 696 604 | 2/1996 |
| EP | 0696604 | 2/1996 |
| EP | 0714950 | 6/1996 |
| GB | 2272904 | 6/1994 |
| GB | 2286401 | 6/1994 |
| WO | WO 85/05322 | 12/1985 |
| WO | WO 85/05373 | 12/1985 |
| WO | WO 02/055577 | 7/2002 |
| WO | WO 2004/041898 | 5/2004 |
| WO | WO 2004/044012 | 5/2004 |

OTHER PUBLICATIONS

International Search Report for PCT/GB2006/000076 mailed Mar. 27, 2006.
Oertel, G., Polyurethane Handbook, 1993, Hanser.
Traubel, New Materials Permeable to Water Vapor, 1999, Chapter 18, Springer-Verlag.
Woods, ICI Polyurethanes Book, 1990, John Wiley & Sons.
Lomax, "The Oxide-Based Polyurethanes for Breathable, Waterproof Fabrics and Garments", Abstract and Paper; 40th International Man-Made Fibres Congress, Sep. 19-21, 2001, Dornbirn Austria; Fibersource.

* cited by examiner

*Primary Examiner* — Lynda Salvatore
(74) *Attorney, Agent, or Firm* — Joseph Suhadolnik (57) ABSTRACT

A poly(urethane-urea) comprising segments derived from
(a) a diisocyanate or mixture of diisocyanates;
(b) a polyether polyol comprising repeating units of general formula $$-[(CH_2)_mO]-$$

wherein each m is the same or different and is 3 or 4, or a mixture of said polyether polyols; and
(c) a diamine or mixture of diamines,
wherein said polyether polyol segment(s) (b) make up at least 70% by weight of the dry poly(urethane-urea) and wherein the ether oxygen atoms of said polyether polyol segment(s) (b) make up at least 15% by weight of the dry poly(urethane-urea); and wherein said poly(urethane-urea) has an amine end group content of up to 0.2% by weight.

These poly(urethane-urea)s can be manufactured and compounded to give one-component and two-component coating formulations, which can be used to produce materials with good barrier properties such as waterproof breathable fabrics, foul weather and protective clothing, and films for medical and other applications.

37 Claims, 1 Drawing Sheet

Figure 1. Water Vapour Resistance versus Thickness of Films

LOW SWELL, WATER VAPOUR PERMEABLE POLY(URETHANE-UREA)S

This application is the US national phase of international application PCT/GB2006/000076 filed 11 Jan. 2006 which designated the U.S. and claims benefit of GB 0500764.6, dated 14 Jan. 2005, the entire content of which is hereby incorporated by reference.

FIELD OF THE INVENTION

The present invention relates to poly(urethane-urea)s, compositions and coated materials containing the poly(urethane-urea)s and processes for making the poly(urethane-urea)s, compositions and coated materials. The poly(urethane-urea)s are useful for water vapour permeable, waterproof coatings in weatherproof clothing and footwear, industrial workwear including cleanroom coveralls, in medical applications such as wound dressings and protective clothing, for bed sheets and mattress or seat covers, and other non-apparel applications.

BACKGROUND OF THE INVENTION

In recent years, many fabrics have been developed which the various manufacturers claim are both waterproof and water vapour permeable. These materials are commonly described as waterproof breathable fabrics (WBFs), and they normally incorporate a continuous polymer membrane. The membrane may be in the form of a thin coated layer applied directly to the fabric, or as a pre-cast film subsequently bonded to the fabric with an adhesive layer. The direct coatings may comprise one complete layer or more usually a series of different layers, for example, a base coat or tie coat directly attached to the fabric, one or more intermediate coats, and an outermost or top coat. The direct coating may therefore have the same polymer composition throughout, but more usually comprises a series of different polymer compositions applied by successive coating operations. In particular, the base coat and top coat usually have a substantially different polymer composition.

The polymers used in WBFs include poly(tetrafluoroethylene), polyester, polyamide and especially, polyurethane. The complete coatings, separate coated layers, pre-cast films and adhesives may be formed from microporous polymers or hydrophilic polymers, or various combinations thereof may be used in the manufacture of WBFs. A useful reference book for this technology including descriptions of manufacturing techniques and machinery is "New Materials Permeable to Water Vapour", Dr Harro Träubel, Springer-Verlag (Berlin), 1999.

The major use of WBFs is in the waterproof clothing area, although these materials are also used in footwear and industrial clothing as well as some other non-apparel applications. The water vapour permeability of the polymer membrane is sufficient to allow sensible and insensible perspiration to diffuse away from the body.

In some applications, the fabrics have to meet recognized Standards and Specifications lo in terms of liquid water resistance or waterproofness and water vapour transmission properties. For example, fabrics complying with the requirements of "EN 343:2003 Protective clothing—Protection against rain" are often specified for industrial workwear. In this and similar Standards, the breathability of a fabric is evaluated by measuring its water vapour resistance ($R_e$). Fabrics can be classified, partly on the basis of their $R_e$ values as Class 1 with an $R_e$ of greater than 40 m$^2$ Pa/W, Class 2 with an $R_e$ of between 40 and 20 m$^2$ Pa/W, or Class 3 with an $R_e$ of less than 20 m$^2$ Pa/W. Waterproofness is assessed by progressively increasing the liquid water pressure applied to a fabric sample until one droplet penetrates through (hydrostatic head test). The current requirements for Classes 1, 2 and 3 are minimum hydrostatic head resistances of 8, 8 and 13 kPa, respectively. The technical performance of the fabric therefore increases from Class 1 to Class 3. This type of classification and performance requirement is relevant for the present invention and many of the applications described herein.

It should be noted that $R_e$ values are more valuable than alternative measurements of water vapour permeability or transmission, because they are additive quantities. This means that the total water vapour resistance of a clothing assembly, film laminate or multilayer film can be approximated by summation of the resistances of the individual components. The general formula for resistance is thus given by:

$$R = \sum_{1}^{n} R_i$$

or $$R = R_{i,1} + R_{i,2} + R_{i,3} \ldots + R_{i,n}$$

where R is the overall resistance of an assembly, n is the number of layers and $R_i$ is the resistance of each individual layer. Normally, the ordering of layers is not important, i.e. the total resistance of layers stacked in order a,b,c,d is the same as that for other orders such as d,c,b,a or c,d,a,b. This concept is already widely used, for example, for measuring or calculating the thermal resistance of clothing and bedding, the electrical resistance of circuits and the gas or vapour resistance of packaging materials.

A major class of WBF incorporates hydrophilic (water-loving) polyurethane-containing coatings. These hydrophilic polyurethanes are usually segmented or block copolymers comprised of alternating hard and soft segments in their molecular backbone. Hydrophilic polyurethanes often contain 30-60% by weight of poly(ethylene oxide) (PEO) soft segments having the formula —[(CH$_2$)$_2$O]$_n$— where n is an integer representing the average number of ether monomer units in the segment. Typically n ranges from 10 to 50. These interconnected PEO soft segments are usually introduced by reaction of diisocyanates with poly(ethylene glycol)s of various molecular weights which binds the PEO segments into the backbone of the polyurethane chains. The value for n can be estimated from the average molecular weight of the poly(ethylene glycol) which in turn is estimated from standard measurements of hydroxyl content. The hard segments in PEO-containing polyurethanes are usually made from reaction of residual isocyanate groups with short chain diols such as butan-1,4-diol. Other technologies exist for incorporating PEO in pendant groups or terminal groups on the molecular chains.

It should be stated that PEO is water-soluble and is prone to crystallization due to the stereoregularity and close-packing ability of the molecular chains. Therefore the weight proportion and average chain length (or n value) of these PEO segments within the polymer must be confined within a certain range in order to ensure that the polyurethane coating or film remains insoluble in use or does not act as a hydrogel.

The hydrophilic polyurethane coating or film is a solid (i.e. non-microporous) material and therefore does not allow liquid water droplets such as rain to penetrate. However, individual molecules of water vapour may pass through the polyurethane structure by a molecular diffusion action. Thus, these coatings can fulfil the primary function of a membrane used in WBFs.

The diffusion of water vapour through hydrophilic polyurethanes is a complex process, but is thought to involve a number of interactive mechanisms, principally:

1. Movement through pre-existing holes in the polymer structure. Movement via this mechanism is dependent on the number and distribution of pre-existing holes in the material which is in turn dependent on factors such as the physical packing of the molecular chains, free volume and density.
2. Movement via transient holes in the polymer structure. This mechanism clearly depends on the ability of transient holes to form in the material, which in turn relates to segmental chain mobility and cohesive energy between adjacent molecules.
3. Movement assisted by a hydrogen bonding mechanism. This involves the formation of weak temporary bonds between the diffusing water molecules and a series of chemical groups strategically located in the polymer network such that continuous pathways of hydrogen bonding sites exist throughout the coating or film. This can be envisaged as provision of molecular stepping stones.
4. A swelling mechanism, where the influx of water molecules is so great that the molecular chains are forced apart, which can further accelerate the diffusion process. This swelling mechanism can involve substantial uptake of water leading to increases in the surface area and volume of the membrane, which in turn may have a deleterious effect on certain properties. This is the main feature that distinguishes so-called hydrophilic polymer coatings from microporous and low water vapour permeable (both non-swelling) types.

The driving force for water vapour diffusion is provided by the difference in water vapour pressure at the surfaces of the coating. Vapor flows from the region of higher water vapour pressure to the region of lower water vapour pressure. The rate of water vapour diffusion through the membrane is directly proportional to the pressure difference between its two surfaces, and inversely proportional to its thickness. A dynamic equilibrium exists when the vapour pressure at both surfaces eventually becomes equal.

Soft segments containing polyether moieties may be considered for water vapour diffusion involving mechanisms 1-3. The ether group imparts flexibility in the chain and provides hydrogen bond acceptor sites. Usually, however, the diffusion rate of water vapour through these types of polyurethane is relatively slow and insufficient, for example, to provide coated fabrics or laminates which meet the Class 2 or 3 requirements of EN 343:2003 for $R_e$. The exceptions are polyurethanes containing typically 30-60% by weight of PEO, which can be used for textiles meeting the high performance level requirements. This is because PEO has an exceptional affinity for water and will also participate strongly in mechanism 4.

PEO provides a unique capability for hydrophilic transport of water molecules since its stereochemistry mimics that of water itself, for example in terms of the bond angles, bond lengths and hydrogen bond strengths. In particular, the distances between adjacent oxygen atoms in the PEO molecular chains are identical to those in polymeric water clusters. Hydrogen bonding in the two species is therefore entirely complementary.

Other simple polyether moieties such as poly(methylene oxide), poly(acetaldehyde), poly(propylene oxide), poly(trimethylene oxide) or poly(tetramethylene oxide) have a different stereochemistry that is significantly less compatible with that of water. In fact, these other polyethers are insoluble in water. Moreover, polyethers such as poly(acetaldehyde) and poly(propylene oxide) transmit water vapour at lower rates because the bulky methyl group adjacent to the ether oxygen atom impedes the movement of water molecules according to mechanism 3. These polyethers with pendant methyl groups are also less able to exhibit close packing of the molecular structure, which leads to poorer physical properties. Thus, PEO-containing polymers are currently the materials of choice for solid, water vapour permeable polyurethane coatings and films.

With hydrophilic PEO-based polyurethanes, water vapour transport takes place mainly by mechanisms 1-3 under surrounding conditions of low to moderate water vapour pressures or relative humidities. The swelling mechanism 4 is initiated at much higher water vapour pressures, at higher relative humidities for example over 95%, or especially when liquid water comes into contact with the coating or film. Under these latter conditions, the polyurethane will absorb water and swell.

In the swollen state, the diffusion constant for the system and hence the rate of water vapour diffusion through the PEO-based polyurethane can increase by a factor of 3 or more. It is thought that a favorable transport process in this swollen state involves two water molecules that can hydrogen bond to each ether oxygen atom of PEO, whilst a third water molecule forms a temporary bridge between them or a bridge across to a bound water molecule on an adjacent PEO segment. Vapor flow occurs by transfer of these temporarily bound water molecules along PEO chains. However, due to the extreme hydrophilic nature of the PEO soft segment, it is not always possible to restrict the water-uptake of the coating to three molecules per ether oxygen atom and the material will take up even greater amounts of water. When this occurs, water molecules may cluster together and condense within the polymer structure causing the polymer to further swell.

The degree of swelling is normally controlled by careful selection of the hard segment constituents that constrain the PEO soft segment, and optionally by crosslinking. Hydrophilic PEO-containing polyurethanes may have water uptake capacities of 30-100% w/w, but more typically about 50% w/w in a top coat composition. As the coating or film dries out, the polyurethane usually returns to its original dimensional state and physical properties.

Swelling is therefore a normal and controlled feature of hydrophilic PEO-containing polyurethane films and coatings, and it can usually be accommodated in the specific end-application. In some applications, however, this potential swelling is unacceptable and precludes the use of hydrophilic PEO-containing polyurethane coatings. If the membrane is visible, for example in unlined garments or as external coatings on waterproof garments or footwear, contact with droplets of rainfall or condensation may cause uneven areas of swelling that result in unsightly blistering or wrinkling effects. It may be particularly noticeable in unsupported membranes or in coatings attached to dimensionally less stable fabrics such as loosely woven fabrics, scrims, pile fabrics, warp or weft knitted fabrics and nonwovens, which are used in many WBF applications.

There is therefore a recognized need for water vapour permeable, waterproof polyurethane coatings and films which have substantially reduced water uptake, or better still no propensity for swelling.

SUMMARY OF THE INVENTION

The present invention provides a poly(urethane-urea) comprising segments derived from
- (a) a diisocyanate or mixture of diisocyanates
- (b) a polyether polyol comprising repeating units of general formula —[(CH$_2$)$_m$O]— where each m is the same or different and is 3 or 4, or a mixture of said polyether polyols; and
- (c) a diamine or mixture of diamines wherein said polyether polyol segment(s) (b) make up at least 70% by weight of the dry poly(urethane-urea) and wherein the ether oxygen atoms of said polyether polyol segment(s) (b) make up at least 15% by weight of the dry poly(urethane-urea); and wherein said poly(urethane-urea) has an amine end group content of up to 0.2% by weight.

The polymers of the invention are tough yet highly flexible polymers and are durable. Furthermore, they are water vapour permeable but yet show little or no swelling when in contact with liquid water. The polymers can transport water molecules through their structure by diffusion, largely via mechanisms 1-3 above. However, they are not hydrophilic in the accepted sense, because they do not participate in the swelling mechanism 4.

Transport of water vapour through the non-hydrophilic polymers of the present invention is accelerated because of the unusually high proportion of ether oxygen atoms, constituting at least 15% by weight (w/w), and preferably at least 18% by weight (w/w) of the poly(urethane-urea). However, due to the insolubility of the ether oxygen atom main donors, typically poly(tetramethylene oxide) and poly(trimethylene oxide), when in contact with liquid water or under conditions of very high water vapour pressure, the up-take of water into the polymer is significantly lower than with the previously known PEO-based polymers. Therefore, coated materials comprising the poly(urethane-urea) of the present invention are water vapour permeable and yet have surfaces that swell significantly less than known hydrophilic barrier fabrics. Membranes or coatings of poly(urethane-urea)s prepared according to the present invention typically have water uptakes of less than 10% w/w and preferably less than 3% w/w, compared with typical values of about 50% w/w and 50-100% w/w for hydrophilic PEO-containg polyurethane top coats and base coats, respectively.

Materials which are coated with the poly(urethane-urea)s of the present invention can therefore be used in locations where they will be visible to the user, and do not suffer from unsightly blistering or wrinkling when the surface gets wet. The coated materials also typically have good wet properties such as wet flex, wet abrasion, wet adhesion and washability. Their water vapour transport, liquid water resistance and relevant physical properties are not significantly impaired following prolonged wetting or washing.

The polymers of the present invention have a relatively high soft segment content, (typically total polyether content) of at least 70% and preferably at least 80% by weight of the polymer. This would generally be expected to lead to softer, tackier and less durable polymers when compared with polyurethanes conventionally used in these WBF applications. However, poly(urethane-urea)s of the invention have surprisingly good physical properties such as toughness and abrasion, snagging and puncture resistance, useful in particular for external top-coats, combined with the requisite levels of water vapour permeability and liquid water resistance.

In another aspect, the present invention provides a process for manufacturing a polymer of the invention comprising polymerizing
- (a) a diisocyanate or mixture of diisocyanates;
- (b) a polyether polyol as defined above or a mixture of said polyether polyols; and
- (c) a diamine or mixture of diamines.

The amount of polyether polyol (b) should be sufficient to provide at least 70% by weight polyether polyol and at least 15% by weight ether oxygen atoms based on the total weight of dry poly(urethane-urea). The process may be carried out, for example, by stepwise reaction of (a) with (b) and subsequently with (c). The reaction is conveniently carried out in a solvent or mixture of solvents.

In another aspect, the present invention provides a composition comprising the polymer of the invention and a solvent, optionally with one or more additives, e.g. cross-linkers and matting agents.

In another aspect, the present invention provides films comprising a poly(urethane-urea) of the invention. Also provided are coated materials having a coating comprising a poly(urethane-urea) of the invention. The films may be multi-layer films having two or more film layers and the coated materials may have multi-layer coatings comprising two or more coated layers and/or film layers. The coated layer or film layer comprising the polymer of the invention is typically the outermost layer, so that the low-swelling or non-swelling layer is the visible layer. Blistering of the material when in contact with liquid water is therefore not generally observed.

Processes for producing these films and coated materials are also provided. The process may comprise applying a composition of the invention to a material or release substrate, removing the solvent, optionally curing the poly(urethane-urea) and, where a film is produced, optionally removing the release substrate from the film. Alternatively, the coated material is produced by applying a film comprising the poly(urethane-urea) of the invention to a material having an adhesive layer thereon. The process may also comprise removing the release substrate, said application and removal steps being carried out in either order.

In the case of multi-layer films and coatings having a coated layer or film layer comprising the poly(urethane-urea) of the invention as the outermost layer, any underlying layers including the adhesive layer are typically also water vapour permeable, and can be formed, for example, from either foamed, microporous or hydrophilic polymers. In particular, composites of an outermost coated layer or film layer comprising the poly(urethane-urea) of the invention with one or more underlying layers of hydrophilic polymers can provide beneficial and unexpectedly low water vapour resistance.

The present invention also provides an article of clothing or footwear, a tent, bivouac bag, protective blanket, mattress cover, bed sheet, seat cover, wound dressing or drape comprising a coated material incorporating the polymer of the invention.

Also provided is the use of polytetramethylene oxide and/or polytrimethylene oxide, for example the use of a poly(urethane-urea) comprising segments derived from polytetramethylene oxide and/or polytrimethylene oxide, to provide water vapour permeable, low swelling coatings for fabrics.

DETAILED DESCRIPTION OF THE INVENTION

Polymers

The constituents (a), (b) and (c) from which the polymers of the invention are derived may be selected from known raw materials used in polyurethane and poly(urethane-urea) chemistry.

Suitable diisocyanates for constituent (a) include aliphatic, cycolaliphatic, aromatic, and partially aromatic diisocyanates. Examples of such diisocyanates include but are not limited to 1,4-tetramethylene diisocyanate, 1,6-hexamethylene diisocyanate (usually abbreviated to HDI), 1,10-decamethylene diisocyanate, 1,12-dodecamethylene diisocyanate, 2,4,4-trimethylhexamethylene-1,6-diisocyanate, cyclohexane-1,3-diisocyanate and cyclohexane-1,4-diisocyanate and any mixture of these isomers (CHDI), 1,3-bis(isocyanatomethyl)cyclohexane and 1,4 bis(isocyanatomethyl)cyclohexane and any mixture of these isomers, 1-methyl-cyclohexane-2,4-diisocyanate and 1-methyl-cyclohexane-2,6-diisocyanate and any mixture of these isomers, 3-isocyanatomethyl-3,5,5-trimethylcyclohexyl isocyanate (isophorone diisocyanate, IPDI), 2,2'-diisocyanatodicyclohexylmethane and 2,4'-diisocyanatodicyclohexylmethane and 4,4'-diisocyanatodicyclohexyl-methane and any mixture of these isomers ($H_{12}$MDI), 2,4-diisocyanatotoluene and 2,6-diisocyanatotoluene and any mixture of these isomers (TDI), 2,2'-diisocyanatodiphenylmethane and 2,4'-diisocyanatodiphenylmethane and 4,4'-diisocyanatodiphenylmethane and any mixture of these isomers (MDI), 1,5-naphthylene diisocyanate, m-xylylene diisocyanate (XDI), m-tetramethylxylylene diisocyanate (TMXDI) and p-phenylene diisocyanate (PPDI). Highly preferred diisocyanates are the aliphatic types such as HDI, CHDI, IPDI and particularly $H_{12}$MDI.

Suitable polyether polyols for constituent (b) contain units of formula $$-[(CH_2)_mO]_n-$$

where each m is the same or different and is 3 or 4 and n is the average number of ether units in each polyether polyol. n is typically in the range of from 10 to 70, for example 15 to 70, or 20 to 60. These segments are most usefully incorporated by reaction of diisocyanate (a) with the corresponding glycols, i.e.

$$HO-[(CH_2)_mO]_n-H$$

These glycols include (i) poly(trimethylene glycol) where m=3 and n typically ranges from 15 to 70, preferably from 35 to 55, and (ii) poly(tetramethylene glycol) where m=4 and n typically ranges from 10 to 60, preferably from 25 to 45. Mixtures of poly(trimethylene glycol) and poly(tetramethylene glycol), typically in the specified n ranges, can also be used, as can copolymers containing both m=3 and m=4 units and typically having a total n of from 15 to 70. Poly(tetramethylene glycol)s are the preferred constituents because they are readily available from the ring opening polymerization of tetrahydrofuran. The polyether polyol segments typically provide an ether oxygen atom content of at least 15%, e.g. at least 18% and typically up to 25% by weight based on the weight of the dry polymer.

In one embodiment of the invention, in addition to the polyether polyol segments (b), the poly(urethane-urea) may contain polyethylene oxide (PEO) segments. These segments are typically present in an amount of less than 10%, for example no more than 5% or no more than 2% by weight of the dry poly(urethane-urea). In an alternative embodiment of the invention, the poly(urethane-urea) does not contain PEO segments.

Suitable diamines for constituent (c) include aliphatic, cycloaliphatic, aromatic, partially aromatic and heterocyclic diamines. Examples of such diamines include but are not limited to 1,2-ethylenediamine (EDA), 1,3-propanediamine, 1,4-butanediamine (BDA), 1,6-hexamethylene diamine (HDA), cyclohexane-1,3-diamine and cyclohexane-1,4-diamine and any mixture of these isomers (CHDA), 3-aminomethyl-3,5,5-trimethylcyclohexylamine (isophorone diamine, IPDA), 2,2'-diaminodicyclohexylmethane and 2,4'-diaminodicyclohexylmethane and 4,4'-diaminodicyclo-hexylmethane and any mixture of these isomers ($H_{12}$MDA), 2,4-diaminotoluene and 2,6-diamino-toluene and any mixture of these isomers (TDA), 2,2'-diaminodiphenylmethane and 2,4'-diaminodiphenylmethane and 4,4'-diaminodiphenylmethane and any mixture of these isomers (MDA), 1,5-naphthylene diamine, 4,4'-methylene-bis(3-chloroaniline), dimethylthio-toluene-diamine, 1,3-diaminobenzene, 1,4-diamino-benzene, 3,3'-dimethoxy-4,4'-diamino biphenyl, 3,3'-dimethyl4,4'-diamino biphenyl, 4,4'-diamino biphenyl, 3,3'-dichloro-4,4'-diamino biphenyl, m-xylylene diamine (XDA), m-tetramethylxylylene diamine (TMXDA), p-phenylene diamine (PPDA) and piperazine. Highly preferred diamines are EDA, BDA, HDA, CHDA, IPDA and $H_{12}$MDA.

The main physical properties and other properties such as permeability, solubility and chemical resistance of the poly(urethane-urea)s depends on the hard segment-soft segment balance resulting from the actual molar ratios used of the selected constituents (a), (b) and (c). The initial isocyanate/hydroxyl (NCO/OH) molar index provides an indication of the hard segment-soft segment balance. An NCO/OH index of 2 indicates an equal balance, whereas the soft segment properties will tend to predominate at values below 2, and hard segment properties will tend to predominate at values above 2. The poly(urethane-urea)s of the present invention have typical indices of 1.4-2.0, which reflects the high soft segment content required for adequate water vapour permeability.

The poly(urethane-urea)s of the invention may be produced by polymerizing, using standard techniques, the diisocyanate(s), polyol(s) and diamine(s). The process used may be a batch, continuous or semi-continuous process. The poly(urethane-urea)s can be made in a one-shot process where all of the reactants are mixed together simultaneously or substantially simultaneously, or in a stepwise process where different reactants are added successively.

The polyols and diamines to be used in the reaction have significantly different reactivities towards isocyanates. For example, the reactivity of a primary amine group towards an isocyanate is at least two orders of magnitude greater than that of a primary hydroxyl group. For this reason, the poly(urethane-urea)s of the invention are preferably manufactured in a stepwise process, and most preferably by a stepwise process where the diisocyanate (a) is first reacted with the polyol constituent (b) to form an isocyanate-terminated prepolymer, which is subsequently chain extended by reaction with the diamine reactant (c). The isocyanate-terminated prepolymers may optionally be characterized, isolated, stored under a suitable inert atmosphere and/or transported for subsequent use.

The poly(urethane-urea)s of the invention are considered to be non-thermoplastic or non-thermoformable compared with the equivalent polyurethanes which are considered to be thermoplastic or thermoformable. The poly(urethane-urea)s of the present invention are therefore not suitable for melt processing, film extrusion or other thermoforming techniques, but are instead typically manufactured and processed in solution.

The polymerization process is therefore typically carried out in an organic solvent or mixture of solvents. Although these reactions are exothermic, tin-based catalysts such as dibutyl tin dilaurate or preferably stannous octoate can be used in combination with externally-applied heating to shorten reaction times. Catalyst levels, when they are used are typically in the range 10-1000 ppm based on total weight of reactants. The poly(urethane-urea)s of the present invention are preferably manufactured as solutions containing typically 20-40% solids with a viscosity range of 100-500 poise, and more preferably with a solids content of 25-35% and viscosity range of 150-400 poise. The viscosity of the poly(urethane-urea) solution is monitored during processing and can be controlled by terminating the polymerization reaction by stopping reagent feeds and/or by addition of specific chain stopping or capping agents. Typical chain stoppers and capping agents include monofunctional isocyanates for reaction with amine end groups and monofunctional primary or secondary amines for reaction with isocyanate end groups.

The stepwise process for manufacturing the poly(urethane-urea)s may involve slow addition of diamine solution to an isocyanate-terminated prepolymer. However, the poly(urethane-urea)s are preferably manufactured by an inverse process, where the isocyanate-terminated urethane prepolymer solution is added to a stirred solution of diamine. The inverse process assists with control of viscosity build-up and hence mw of the polymer, and minimizes batch to batch variation in the poly(urethane-urea).

The first stage of the reaction, typically involving a stoichiometric excess of diisocyanate (a) and polyether polyol (b), may be carried out in an inert or aprotic solvent. Toluene is suitable for polymers of the present invention, but other solvents may be used, for example N,N'-dimethylformamide (DMF), N,N'-dimethylacetamide (DMAc) and tetrahydrofuran (THF). Alcohols cannot be used at this stage because they have similar reactivity towards isocyanate groups as the polyether diol (b), and would severely retard or stop the polymerization.

In the chain extension stage, however, hydroxyl-containing solvents and especially secondary or tertiary alcohols can be used, because the diamine reagent (c) is vastly more reactive towards the isocyanate-terminated prepolymer. Blends of toluene and isobutanol are particularly suitable solvents for diamines used in the present invention, and give poly(urethane-urea) solutions with useful characteristics, for example, of rheology, substrate wetting and evaporation rates for subsequent processing into coatings and films.

Using the preferred inverse process for chain extension, the viscosity of the reacting product solution and hence the mw build-up of the polymer is carefully monitored. Addition of isocyanate-terminated urethane prepolymer is stopped when a pre-set viscosity target is reached. The resultant poly(urethane-urea) contains reactive amine end groups, and the NCO/OH+$NH_2$ stoichiometry after chain extension is typically only 80-95% of theoretical, due in part to known side reactions that take place in polyurethane and poly(urethane-urea) chemistry. Poly(urethane-urea)s of the present invention therefore have amine end group contents of up to 0.2% w/w, e.g. 0.005 to 0.15% w/w, which means that they can be usefully employed in both one and two component coating formulations.

Amine end groups can if desired, be capped using standard techniques to provide polymers having amine end group contents of substantially zero. Capping may, for example, be carried out with a stoichiometric amount of monofunctional isocyanate such as phenyl isocyanate, cyclohexyl isocyanate and p-toluenesulphonyl isocyanate. During the capping reaction, a further increase in viscosity is observed. This probably results from changes in the solubility of the poly(urethane-urea) in the chosen solvent system as polar amine end groups on the molecular chains are converted to non-polar residues, rather than further build up in mw.

Polymer Compositions

The present invention also provides polymer compositions comprising a poly(urethane-urea) of the invention and a solvent. The composition may comprise a single poly(urethane-urea) or may comprise blends of two or more poly(urethane-ureas). Such compositions typically have a poly(urethane-urea) content of from 20 to 40% by weight, preferably from 25 to 35% by weight. The polyether polyol segments (b) therefore typically make up at least 14%, preferably at least 20% by weight of the total composition, based on the dry weight of the composition. PEO is, in one embodiment, present in the composition in an amount of no more than 4%, preferably no more than 2% by weight based on the dry weight of the composition. PEO may alternatively be substantially absent from the composition.

The viscosity of such a composition is typically from 100 to 500 poise, typically from 150 to 400 poise. Such compositions can be directly obtained by polymerization in a suitable solvent as described above and by controlling the viscosity, for example by terminating the urethane prepolymer feed or by terminating reaction by addition of capping agents or chain stoppers.

Suitable solvents for use in the composition are those described above in which polymerization is carried out. Particularly suitable solvents are hydroxyl-containing solvents, in particular blends of a hydroxyl-containing solvent (e.g. an alcohol) with a further solvent. Blends of toluene with an alcohol, most preferably isobutanol, are preferred.

The poly(urethane-urea)s can be manufactured as a one-component (1-K) system which is essentially fully reacted, or as a two-component (2-K) system where amine end groups remain for subsequent reactions with complementary additives such as crosslinkers. The separate components of the 2-K system are usually mixed just prior to application to a substrate, and there is often a limited lifetime (pot-life, usually measured in hours) 25 before the mixture becomes unusable. Useful reference books for this technology include Polyurethane Handbook, Gunter Oertal, Hanser (New York), 1993, particularly Chapter 2 and ICI Polyurethanes Book, George Woods, John Wiley & Sons (Chichester), 1990.

For 1-K systems, the amine groups are typically capped. Thus the 1-K compositions of the invention comprise a solution of a poly(urethane-urea) of the invention wherein the amine end group content is substantially zero.

For 2-K systems, the amine groups are left uncapped for subsequent compounding with reactive crosslinkers prior to application. Thus, the 2-K compositions of the invention comprise a solution of a poly(urethane-urea) of the invention wherein the amine end group content is greater than 0 and up to 0.2% by weight, e.g. from 0.005 to 0.15% by weight. These compositions typically also comprise a cross-linker.

Crosslinkers based on multifunctional isocyanates or melamine-formaldehyde (MF) precondensates plus appropriate catalyst are widely used in hydrophilic polyurethane technology for WBFs. Free isocyanates cannot be used with amine-tipped poly(urethane-urea) solutions, however, because the pot-life is unacceptably short. The preferred option is to use multifunctional blocked isocyanates (i.e. an isocyanate blocked with a blocking agent), which can be compounded into the composition and provide long pot-life stability. These types of crosslinkers will only "unblock" on achieving a minimum elevated temperature, forming the original blocking agent and an isocyanate which can then participate in normal crosslinking reactions of polyurethanes and poly(urethane-urea)s. The actual unblocking temperature is largely predetermined by the original selection of isocyanate and blocking agent precursors, for example as described in WO02055577. With some manufacturing techniques, it is desirable to keep the maximum processing temperature below 130° C., for instance, to prolong the useable lifetime of heat-sensitive release papers used in film production and transfer coating. Crosslinkers unblocking in the temperature region of 90-130° C., such as those based on diethyl malonate and 3,5-dimethylpyrazole are therefore preferred.

Other compounding additives which may be present in the compositions include stabilisers, to help protect the polymer chains from degradation for example caused by uv light or oxidation and matting agents or delustrants.

Combinations of anti-oxidants based on t-butylated phenols, uv absorbers based on benzotriazoles and hindered amine light stabilisers (HALS) at levels of 0.1-0.4% w/w per reagent are preferred stabilisers for the poly(urethane-urea)s of the present invention.

Matting agents are commonly added to the compositions where they are intended as coating formulations for textiles, usually to decrease surface gloss and improve opacity, but they can also reduce the tendency of the coated surface to stick or "block" to another surface, or to itself. Blocking can occur, for example, when soft or unduly tacky coatings come into contact with other surfaces under pressure or at elevated temperatures. Such conditions might arise for example when tightly wound rolls of fabric or film or stacked garments are stored or transported in excessive heat or humidity, or if normally suitable coatings are severely degraded e.g. by hydrolysis. The selection of matting agent is important because it may have a deleterious effect on the water vapour permeability and waterproofness of the solid membranes, especially at high loadings. If matting particles are too large or coarse or poorly wettable, they may cause gross defects such as pinholes or cracks in the coating, which might increase water vapour permeability of the film or coating but only at the expense of its waterproof properties. Conversely, if the particles are too fine and packed close together or form overlapping platelets, they can impede the flow of water vapour. Matting agents based on organically-coated, precipitated silica with particle size of from 2 to 5, e.g. 2 to 4 μm, e.g. at loadings of 10-20% w/w on dry polymer are preferred for coating formulations of the present invention.

The compositions of the invention may be further compounded, e.g. with pigments or flame retardants before they are cast as coatings. Cheapening fillers may also be included, but are not normally used in high performance coatings and films for WBFs.

Coated Materials and Films

The present invention also provides coated materials (typically coated textiles or fabrics) having a coating comprising a poly(urethane-urea) of the invention. The methods available for manufacturing such coated materials include direct coating, transfer coating, and a number of different film lamination processes. In a direct coating method, a composition of the invention is cast onto the appropriate substrate, usually a textile, and subsequently dried, and optionally cured or crosslinked, e.g. under controlled conditions of temperature and dwell time or throughput. This provides a coated layer of the polymer of the invention on the substrate. The coated layer is typically non-microporous.

In this method, the coated layer may be provided either directly on the substrate, or the substrate may comprise one or more additional layers, e.g. polymer layers, on its surface. Water vapour permeable tie or base coats and intermediate layers may, for example, be present on the substrate surface. For instance, the substrate may be a textile having a layer of foamed, microporous or hydrophilic polymer. Thus, multi-layer coatings having several coated layers (and/or film layers) are provided. Typically, the coated layer of the invention is provided as the outermost layer.

In a transfer coating method, the composition of the invention is cast onto a removable release substrate, e.g. release paper and then dried and optionally cured to provide a film on the release substrate. The film is typically non-microporous. The release substrate is, for example, a siliconized paper or blanket. The film may be stored and/or transported in this format prior to further use, or the release substrate may be removed prior to storage or use.

The film is typically then bonded to a material using a layer of adhesive. The layer of adhesive may be applied to either the film or the material or both the film and the material. The adhesive layer may be either continuous or discontinuous and typically comprises a foamed, microporous or hydrophilic polymer formulation. The release substrate is removed either before or after application of the film to the material.

As for the directly coated layers, multi-layer coatings may be produced in this way. For example, the film which is applied to the material may be a pre-formed multi-layer film, and/or additional layers may be present on the material prior to application of the film of the invention. These additional layers may be water vapour permeable tie or base coats and intermediate layers. Thus, multi-layer films, and materials coated with multiple film layers (and/or coated layers), are provided. Typically, the film layer comprising the polymer of the invention is provided as the outermost layer.

The coated layers or film layers produced by these processes have a good balance of low swell and water vapour permeability properties. The water uptake is less than 10% w/w of dry polymer and preferably between 0.5 and 3% w/w under equilibrium swelling conditions. The water vapour resistance is less than 5 $m^2$ Pa/W per micron of thickness and preferably between 0.5 and 2.0 $m^2$ Pa/W per micron of thickness. The thickness of the film layer or coated layer for the applications described herein is typically from 5 to 90 μm, e.g. from 10 to 90 μm and more preferably from 15 to 35 μm. By comparison, hydrophilic PEO-based polyurethanes of similar thickness have high water uptakes typically of between 50 and 100% w/w, which is unacceptable for some applications.

Water uptake data can also be used to estimate the maximum water molecule:ether oxygen atom ratio, which provides a measure of the hydrophilicity of these polymers. The preferred water uptake range of the poly(urethane-urea)s of the invention corresponds to a very low water:ether oxygen ratio of approximately 0.02-0.2, compared with a water:ether oxygen ratio of at least 2.5 and generally more than 3.0 for hydrophilic PEO-based polyurethanes under equilibrium swelling conditions. Correspondingly, water droplets placed on the surface of these poly(urethane-urea) films and coatings do not wet out or cause immediate wrinkling or blistering, phenomena that are normally associated with hydrophilic polymers used in WBFs.

The coated layers and film layers of the invention also have a good balance of toughness, extensibility and low modulus which is desirable for components used in WBFs and other applications described herein. The tensile strengths of these materials are typically at least 30 MPa and more usually above 50 MPa, their elongation at break is typically at least 500%, e.g. at least 800%, and they have 100% modulus values typically in the range 1-6 MPa.

By selection of the appropriate substrate, polymer formulations and manufacturing techniques, the coated materials of the invention may be designed to have the desired balance of low swell outer surface, water vapour permeability and waterproofness. These materials typically have hydrostatic head resistances above 10 kPa and more preferably above 20 kPa, and water vapour resistances of less than 40 m² Pa/W and would for example meet the Class 2 or Class 3 requirements of EN 343:2003 in these aspects.

The coated materials of the invention may comprise a coated layer or film layer of the invention in combination with a hydrophilic layer. The hydrophilic layer is, for example, a layer containing from 30 to 60% by weight of poly(ethylene oxide) soft segments as is known in the art and described in the "background to the invention" section. The coated layer or film layer of the invention is typically the outermost layer.

Such combinations of low swell outer layers comprising polymers of the invention with conventional hydrophilic layers are anisotropic, because they show a strong directional effect of water vapour flow on $R_e$. This effect is most obvious in bilayer and multilayer films comprising low swell and hydrophilic polymers, and the magnitude of the effect is significant in the context of overall breathability of materials such as WBFs. Synergy is observed when the vapour flow occurs first through the hydrophilic surface, which results in lower than expected $R_e$ values for the composite. Conversely, vapour flow that occurs first through the low swell surface has an undermining effect on the hydrophilic layer, which results in higher than expected $R_e$ values. This unexpected, additional control feature for water vapour flow may be usefully incorporated into the design of multilayer films, other materials such as coated fabrics and end products such as garments.

Thus, the polymers of the invention can be used to provide WBFs for clothing and footwear, including industrial or military clothing, survival suits, foul weather clothing which may include heavy-duty foul weather clothing as well as sportswear and leisure wear, and walking boots. Tents and bivouac bags may also be provided. They may also be used for other flexible substrates such as natural and synthetic leather. In addition the coated fabrics of the invention may be incorporated into protective blankets for animals, mattress covers, bed sheets and other similar items such as seat covers.

Due to the solid structure of the poly(urethane-urea) films and coated layers, the films and coated materials of the invention also have the further advantage that fluids and particulate matter such as dust or airborne contaminants, bacteria and viruses may be prevented from passing through the membrane. The films and coated materials are therefore useful in cleanroom workwear and numerous medical applications such as wound dressings, surgeons' gowns, drapes and other biologically protective garments or barrier covers where water vapour permeability is useful but where a barrier to contaminants such as bacteria and viruses is required.

The following examples and comparative examples serve to illustrate the present invention, but are not intended to limit the scope.

Test Methods

Tensile testing was carried out on dumbbell test specimens of film following the method of ISO 37:1994, using a Lloyd Tensometer complying with ISO 7500-1:2004 at a test speed of 250 mm/min.

Shore A hardness was tested according to ISO 7619-1: 2004 using a Wallace durometer.

The hydrostatic head of test specimens was determined by the method of ISO 811: 1981.

The water uptake of films was measured by the following method. Squares of film (20 mm×20 mm) were kept in a desiccator containing silica gel for 24 hours. The dried films were weighed ($w_1$) and immersed in distilled water at 25° C. for 3 hours. The films were blotted dry of surface water and immediately reweighed ($w_2$). The water uptake of the film (as % w/w) was calculated from $100(w_2-w_1)/w_1$. Volume swelling could be estimated by measuring the change in area and thickness of the film sample after immersion in water.

Figure 1:
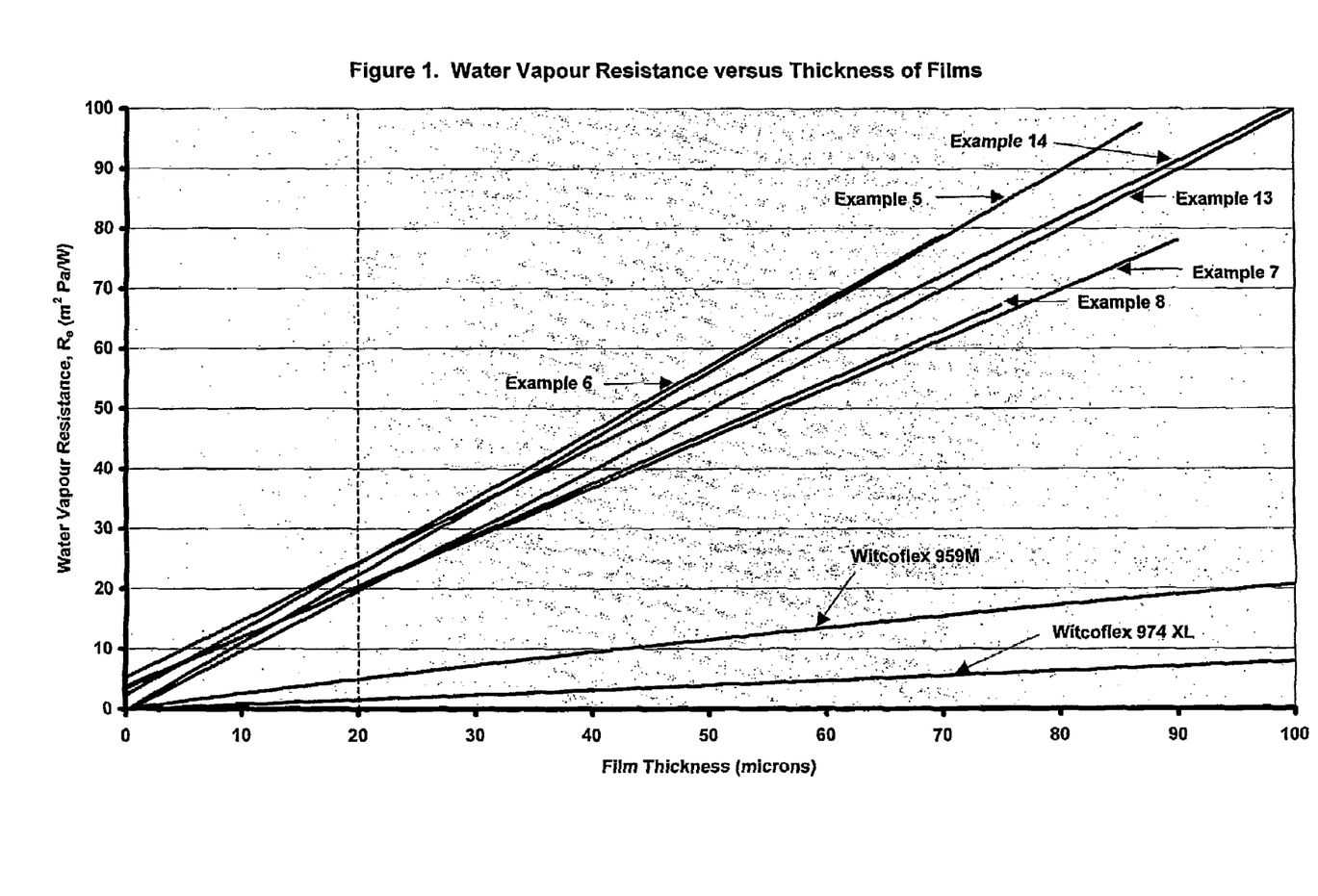
FIG. 1 shows the water vapour resistance of a number of films of the invention, as well as some films of the prior art, over a range of thicknesses.

For comparative purposes, the water vapour resistance ($R_e$) of films, coated and laminated fabrics and base fabrics was measured at 20-23° C. following the method of "ISO 15496: 2004 Textiles—Measurement of the water vapour permeability of textiles for the purpose of quality control". The ISO test expresses breathability as water vapour permeability ($W_d$ in g/m² Pa h) but the results can also be used to provide resistance data by the calculation $R_e=1/W_d\phi$, where $\phi$ is the latent heat of vaporization of water (in Wh/g) at the test temperature. This test method develops a nominal relative humidity of 100% at one surface of the sample and about 23% at the other surface, with water vapour flow in the direction 100% RH→23% RH. At 21° C., for example, the water vapour pressure difference across the test specimen is 1914 Pa which provides a large driving force for vapour flow, and $\phi=0.681$ Wh/g. Measurements carried out on poly(urethane-urea) films of varying thickness or on stacked layers of films (3-5 layers) were used to generate the $R_e$ versus thickness profiles in FIG. 1. These profiles can be used to estimate the $R_e$ value of the poly(urethane-urea) or other coating layer at any nominal thickness in the range of 5-70 μm, which is appropriate for use in WBF applications. This information can be used to calculate theoretical $R_e$ values for multilayer assemblies of known composition for comparison with measured $R_e$ values.

EXAMPLE 1

The preparation of a poly(urethane-urea) with an initial NCO/OH index of 1.4 was carried out as follows. Poly(tetramethylene glycol) of average mw 2000 (PolyTHF® 2000-BASF, 1530.0 g) was charged to a 5-liter flanged flask equipped with a mechanical stirrer, addition funnel inlet, thermometer, nitrogen inlet and water condenser with nitrogen outlet. 4,4'-Diisocyanatodicyclo-hexylmethane ($H_{12}$MDI, Desmodur® W—Bayer, 281.0 g), toluene (453.0 g) and stannous octoate catalyst (0.40 g) were added and the contents of the flask were heated by isomantle and maintained at 85-95° C. for 4 h, then allowed to cool overnight. A further aliquot of toluene (522 g) was added to give a prepolymer with 65% solids and a measured isocyanate content of 0.92%, against a theoretical value of 0.97%. This isocyanate-terminated urethane prepolymer was temporarily stored under a nitrogen blanket.

Isophorone diamine (IPDA, 28.0 g), toluene (371.7 g) and isobutanol (1266.3 g) were stirred together in a separate 5-liter flanged flask. The isocyanate-terminated prepolymer (1285.9 g) was added slowly during 1.5 h to the stirred solution of IPDA at room temperature. After 1 h, the resultant poly(urethane-urea) solution had a solids content of 29.3%, viscosity of 305 poise and a constant amine end group content of 0.034%.

The poly(urethane-urea) of Example 1 has an ether oxygen atom content of 18.1% w/w, a PTMEO (polytetramethylene oxide) soft segment content of 81.7% w/w and an amine end group content of 0.12% w/w.

EXAMPLE 2

The preparation of a poly(urethane-urea) with an initial NCO/OH index of 1.7 was carried out as follows. An isocyanate-terminated prepolymer solution was prepared according to the method of Example 1 from poly(tetramethylene glycol) mw 2000 (1500.0 g), 4,4'-diisocyanatodicyclo-hexylmethane (334.5 g) and toluene (612.0 g). The solution had a solids content of 75% and measured isocyanate content of 1.64%.

The isocyanate-terminated urethane prepolymer (858.5 g) was chain extended following the method of Example 1 by addition to a stirred solution of isophorone diamine (33.0 g) in toluene (456.0 g) and isobutanol (1038.5 g). The resultant poly(urethane-urea) solution had a solids content of 28.4%, viscosity of 340 poise and an amine end group content of 0.031%.

The poly(urethane-urea) of Example 2 has an ether oxygen atom content of 17.2% w/w, a PTMEO soft segment content of 77.6% w/w and an amine end group content of 0.11% W/W.

EXAMPLE 3

The preparation of a poly(urethane-urea) with an initial NCO/OH index of 1.6 was carried out as follows. An isocyanate-terminated prepolymer solution was prepared according to the method of Example 1 from poly(tetramethylene glycol) mw 2900 (Terathane® 2900—Invista, 1740.0 g), 4,4'-diisocyanatodicyclohexyl-methane (252.0 g) and toluene (855.0 g). The solution had a solids content of 70% and measured isocyanate content of 1.03%.

The isocyanate-terminated urethane prepolymer (882.6 g) was chain extended following the method of Example 1 by addition to a stirred solution of isophorone diamine (21.0 g) in toluene (373.0 g) and isobutanol (1010.0 g). The resultant poly(urethane-urea) solution had a solids content of 27.0%, viscosity of 165 poise and an amine end group content of 0.032%.

The poly(urethane-urea) of Example 3 has an ether oxygen atom content of 18.8% w/w, a PTMEO soft segment content of 84.5% w/w and an amine end group content of 0.12% w/w.

EXAMPLE 4

The preparation of a poly(urethane-urea) with an initial NCO/OH index of 2.0 was carried out as follows. An isocyanate-terminated prepolymer solution was prepared according to the method of Example 1 from poly(tetramethylene glycol) mw 2900 (1694.0 g), 4,4'-diisocyanatodicyclo-hexylmethane (306.4 g) and toluene (666.8 g). The solution had a solids content of 75% and measured isocyanate content of 1.86%.

The isocyanate-terminated urethane prepolymer (788.9 g) was chain extended following the method of Example 1 by addition to a stirred solution of isophorone diamine (37.8 g) in toluene (582.0 g) and isobutanol (1173.0 g). The resultant poly(urethane-urea) solution had a solids content of 28.0%, viscosity of 290 poise and an amine end group content of 0.028%.

The poly(urethane-urea) of Example 4 has an ether oxygen atom content of 17.7% w/w, a PTMEO soft segment content of 79.7% w/w and an amine end group content of 0.12% w/w.

EXAMPLE 5

A 1-K, clear coating formulation was prepared as follows. Monofunctional aromatic isocyanate (Trixene® AS—Baxenden Chemicals, 19.1 g) was added to the stirred poly(urethane-urea) solution (2950 g) of Example 1 over a period of 0.5 h at room temperature. The monofunctional isocyanate (14% free NCO) was used in stoichiometric ratio to react with the amine end groups. Anti-oxidants and uv stabilisers (1.8 g each of Irganox® MD1024, Tinuvin® 326 and Tinuvin® 756—all Ciba Chemicals) were finally added to the stirred poly(urethane-urea) solution to yield a clear coating formulation with solids content of 30.0% and viscosity of 410 poise.

The capped, fully-reacted poly(urethane-urea) of Example 5 has an ether oxygen atom content of 17.6% w/w and a PTMEO soft segment content of 79.1% w/w.

This formulation was cast onto glass plates or release paper, and fully dried to give visually clear films with thicknesses of between 20 μm and 1 mm. Films had a tensile strength of 45 MPa, 100% modulus of 1.9 MPa, elongation at break of 1300%, water uptake of 1.3% w/w with negligible volume swelling and water vapour resistance ($R_e$) of 24 m$^2$ Pa/W per 20 μm film thickness (estimated from FIG. 1). Droplets of distilled water placed on the surface of the film showed no propensity to wet out, or to cause wrinkling or swelling of the polymer during an intermittent observation period of 4 h.

EXAMPLE 6

Following the method of Example 5, Trixene AS (13.9 g) and stabilisers (1.4 g each of Irganox MD1024, Tinuvin 326 and Tinuvin 756) were added to the stirred poly(urethane-urea) solution (2385.5 g) of Example 2. The resultant 1-K, clear coating formulation had a solids content of 29.3% and viscosity of 456 poise.

The capped, fully-reacted poly(urethane-urea) of Example 6 has an ether oxygen atom content of 16.8% w/w and a PTMEO soft segment content of 75.6% w/w.

Films of this formulation had a tensile strength of 55 MPa, 100% modulus of 3.4 MPa, elongation at break of 875%, water uptake of 1.8% w/w with negligible volume or surface swelling and water vapour resistance ($R_e$) of 22 m$^2$ Pa/W per 20 μm film thickness.

EXAMPLE 7

Following the method of Example 5, Trixene AS (13.7 g) and stabilisers (1.4 g each of Irganox MD1024, Tinuvin 326 and Tinuvin 756) were added to the stirred poly(urethane-urea) solution (2286.6 g) of Example 3. The resultant 1-K, clear coating formulation had a solids content of 27.7% and viscosity of 210 poise.

The capped, fully-reacted poly(urethane-urea) of Example 7 has an ether oxygen atom content of 18.2% w/w and a PTMEO soft segment content of 82.1% w/w.

Films of this formulation had a tensile strength of 45 MPa, 100% modulus of 1.9 MPa, elongation at break of 1300%, water uptake of 1.2% w/w with negligible volume or surface swelling and water vapour resistance ($R_e$) of 20 m$^2$ Pa/W per 20 μm film thickness.

EXAMPLE 8

Following the method of Example 5, Trixene AS (27.4 g) and stabilisers (2.5 g each of Irganox MD1024, Tinuvin 326 and Tinuvin 756) were added to the stirred poly(urethane-urea) solution (3955.0 g) of Example 4. The resultant 1-K, clear coating formulation had a solids content of 28.8% and viscosity of 390 poise.

The capped, fully-reacted poly(urethane-urea) of Example 8 has an ether oxygen atom content of 17.2% w/w and a PTMEO soft segment content of 77.3% w/w.

Films of this formulation had a tensile strength of 56 MPa, 100% modulus of 2.7 MPa, elongation at break of 1000%, water uptake of 1.0% w/w with negligible volume or surface swelling and water vapour resistance ($R_e$) of 20 m² Pa/W per 20 μm film thickness.

EXAMPLE 9

(a) A 1-K, matt coating formulation was prepared as follows. Matting agent (Acematt® OK 412—Degussa, which is an organically after-treated precipitated silica with 3 μm particle size) was added to the clear coating formulation (200.0 g) of Example 6 and the solution stirred until the powder was completely dispersed. The matting level was 10% w/w based on dry polymer.

Fully-dried films cast from this formulation had the desired matt appearance, tensile strength of 60 MPa, 100% modulus of 4.9 MPa, elongation at break of 875%, and water uptake of 2.6% w/w with negligible volume or surface swelling.

(b) A 1-K matt coating formulation was prepared by the method of Example 9(a) containing 10% w/w of Acematt® TS 100 (Degussa), which is an untreated thermal silica, 4 μm.

Fully-dried films had the desired matt appearance, tensile strength of 55 MPa, 100% modulus of 5.4 MPa, elongation at break of 875%, and water uptake of 2.2% w/w with negligible volume or surface swelling.

(c) A 1-K matt coating formulation was prepared by the method of Example 9(a) containing 19% w/w of Syloid® W 500 (Grace Davison), which is a synthetic amorphous silica, 4.5-5.5 μm.

Fully-dried films had the desired matt appearance but a papery handle, tensile strength of 36 MPa, 100% modulus of 7.9 MPa, elongation at break of 700%, and water uptake of 5.8% w/w with negligible volume or surface swelling.

EXAMPLE 10

Following the method of Example 9(a), the clear coating formulation of Example 8 was matted with 10% w/w of Acematt OK 412

Films cast from this matted formulation had a tensile strength of 55 MPa, 100% modulus of 5.4 MPa, elongation at break of 850%, water uptake of 2.2% w/w with negligible volume or surface swelling and water vapour resistance ($R_e$) of 20 m² Pa/W per 20 μm film thickness.

EXAMPLE 11

A matt, bilayer film comprising a 1-K low swelling and 1-K swelling surface was made by the following method.

The matted formulation of Example 10 was cast (100 μm wet thickness) onto siliconized release paper (Multimatt® 705, Arjo Wiggins) using a Zappa pilot-scale coating machine (50 cm maximum width) equipped with knife-on-air and knife-over roll coating heads and a three-zone oven (9 m long). The cast poly(urethane-urea) was passed through the oven at 1-2 m/min and dried in successive zones at 40, 80 and 150° C. to give a film of 25 μm approximate thickness. The release paper and film was rewound to the knife-over-roll coating head. A matt, PEO-based hydrophilic poly(urethane-urea) solution (Witcoflex® 959M —Baxenden Chemicals, 30% solids in toluene/isopropanol) was applied to the pre-formed film, and the composite passed through the oven and dried as before. This bilayer film (approximately 50 μm thick) was then stripped from the release paper and wound up onto a cardboard roll.

The anisotropy and synergy in the bilayer film was demonstrated by measuring its water vapour resistance with vapour flow in each of the two planar directions. In a side-by-side experiment using the two different specimen arrangements, the measured $R_e$ values were 17 m² Pa/W (swelling surface next to the high water vapour pressure source, 100% RH) and 36 m² Pa/W (low swelling surface next to the high water vapour pressure source, 100% RH). The calculated $R_e$ for a bilayer film of this composition is 31 m² Pa/W, using data from FIG. 1 for 25 μm polymer layers.

A circular sample (100 mm diameter) of bilayer film was placed with the low swell surface uppermost onto A4 white paper. Droplets (5-10 mm diameter) of (a) distilled water and (b) aqueous dye solution (Nigrosin® WLAH—Bayer Chemicals, 4% w/w in distilled water) were applied to the film surface by pipette. No swelling, blistering or lo staining of the film was observed when the droplets were removed with tissue paper after periods of up to 5 mins.

The experiment was then repeated with the swelling surface of the bilayer film uppermost. By contrast, the droplets of distilled water and dye solution started to wet out immediately and a visible blister and permanent stain, respectively, had formed within 5 seconds after application.

EXAMPLE 12

A transfer-coated fabric with a 1-K low swell outer surface, and hydrophilic inner layers comprising a 1-K intermediate coat and 2-K tie-coat was made by the following method.

A matt bilayer film on release paper was made according to Example 11. PEO-based hydrophilic tie-coat (an intimate mixture of Witcoflex® 974—Baxenden Chemicals, 45% solids in MEK, 100 parts by weight plus Porotan 505® MF precondensate—Rescom, 5 parts and Porotan® 200 catalyst, 3 parts) was applied by knife-over-roll to the pre-formed film. A black knitted liner fabric (55 g/m² with an $R_e$ of 3.2 m² Pa/W) was nipped to the tacky tie-coat surface prior to the release paper entering the coolest zone of the oven. The fabric/polymer/release paper assembly was passed through the oven, where the tie-coat was dried and finally cured at 150-160° C. The transfer-coated fabric was then stripped from the release paper.

This fabric had a total coating weight of 75 g/m², hydrostatic head resistance of greater than 40 kPa and $R_e$ of 20 m² Pa/W (measured with the fabric surface next to the 100% RH source). This compares with a theoretical $R_e$ value of approximately 39 m² Pa/W for the 4-layer system, calculated using data from FIG. 1 for 25 μm polymer layers.

EXAMPLE 13

A poly(urethane-urea) solution was prepared according to Example 4 with a solids content of 30.8%, providing a polymer with an ether oxygen atom content of 18.0% w/w, a PTMEO soft segment content of 80.9% w/w and an amine end group content of 0.01% w/w. This poly(urethane-urea) solution was matted with 15% w/w of Acematt OK 412 to give a 1-K coating formulation.

Fully-dried films of this formulation had a tensile strength of 36 MPa, 100% modulus of 4.1 MPa, elongation at break of 1000%, water uptake of 1.2% w/w with negligible volume or surface swelling and water vapour resistance ($R_e$) of 20 m² Pa/W per 20 μm film thickness.

A monolayer, bilayer and trilayer film incorporating this 1-K coating formulation was prepared by the following method, using the technique outlined in Example 11.

A monolayer film (100 cm×30 cm) of 1-K coating formulation was prepared on release paper, dried and returned to the coating head. A strip of approximately 50×30 cm of bilayer film was prepared by casting Witcoflex 959M onto the dried monolayer film, and fully drying the resultant product. A strip of approximately 25×30 cm of trilayer film was prepared by casting Witcoflex 974 crosslinked tie coat as in Example 12 onto the dried bilayer film and fully drying and curing the resultant product. The combined film was subsequently stripped from the release paper and measurements carried out on the mono-, bi-, and tri-layer portions, with stacking orders a, ab, and abc, respectively, Table 1.

TABLE 1

Measurements Carried out on Multilayer Films Produced According to Example 13

| Film Composition | Total Film Weight (g/m$^2$) | Approx. Thickness (μm) | Measured $R_e$ (m$^2$ Pa/W) | Measured $R_e$ (m$^2$ Pa/W) | Calculated $R_e$ (m$^2$ Pa/W) |
|---|---|---|---|---|---|
| (a) Example 13 formulation | 29 | 30 | 31 | 31 | 30 |
| (a) Example 13 formulation | 62 | 30 | 37 | 56 | 37 |
| (b) Witcoflex 959M | | 30 | | | |
| (a) Example 13 formulation | | 30 | | | |
| (b) Witcoflex 959M | 105 | 30 | 34 | 62 | 40 |
| (c) Witcoflex 974 crosslinked | | 40 | | | |
| (direction of water vapour flow through film) | | | ↑ | ↓ | ↑↓ |

The results clearly show that the measured $R_e$ of the bi- and tri-layer films depends on the direction of water vapour flow through the specimen. Initial flow through the most hydrophilic component (Witcoflex 974 crosslinked) is preferred to the alternative direction of initial flow through the low swell, non-hydrophilic component (Example 13), i.e. stacking layers in order c,b,a provides a significantly higher breathability than a,b,c.

EXAMPLE 14

A 2-K coating formulation was prepared by intimately mixing the matted 1-K coating formulation of Example 13 (200.0 g) with diethyl malonate-blocked isocyanate is crosslinker (Trixene® DP9B/1376—Baxenden Chemicals, 6.0 g). The crosslinker provides a theoretical isocyanate content of 7.3% at unblocking temperatures above 90° C.

Fully-dried and cured films of this formulation had a tensile strength of 46 MPa, 100% modulus of 4.2 MPa, elongation at break of 1050%, water uptake of 1.0% w/w with negligible volume or surface swelling and water vapour resistance ($R_e$) of 24 m$^2$ Pa/W per 20 μm film thickness.

EXAMPLE 15

Samples of direct-coated fabric with a 2-K low swell outer surface and hydrophilic 2-K tie-coat were made by the following method using a Werner Mathis LSA-THN 500 laboratory coater equipped with knife-on-air coating head, electrically-heated oven and travelling stenter pin-frame.

A rectangle (100 cm×30 cm) of woven polyamide fabric (50 g/m$^2$, calendered and fluorocarbon pre-treated, with an $R_e$ of 2.7 m$^2$ Pa/W) was coated with PEO-based hydrophilic polyurethane (Witcoflex 974 formulation, as per Example 12) at 10 m/min throughput. The coated fabric was dried at 70° C. for 3 mins and returned to the coating head. The 2-K coating formulation of Example 14 was subsequently coated on top of the base coat at 10 ml/min throughput. The fabric was passed through the oven at 70° C., 100° C. (3 mins) and finally at 150° C. (3 mins) to fully cure both base and top coats.

A sample of fabric coated accordingly with 27 g/m$^2$ hydrophilic base coat and 9 g/m$^2$ low-swell top coat gave a hydrostatic head resistance of over 20 kPa. This sample gave measured $R_e$ values of 11 m$^2$ Pa/W (fabric side next to the 100% RH source) and 26 m$^2$ Pa/W (coating surface next to the 100% RH source). The calculated $R_e$ is approximately 16 m$^2$ Pa/W, assuming minimal effect of penetration of base coat into the weave of the fabric.

A different sample of fabric coated accordingly with 21 g/m$^2$ base coat and 16 g/m$^2$ top coat gave a hydrostatic head resistance of over 20 kPa. This sample gave measured $R_e$ values of 26 m$^2$ Pa/W (fabric side, as above) and 74 m$^2$ Pa/W (coating surface, as above). The calculated $R_e$ is approximately 26 m$^2$ Pa/W.

The breathabilities of these fabrics again show a clear directional effect of water vapour flow.

EXAMPLE 16

Samples of direct-coated fabric with a 2-K low swell outer surface and a foamed, crosslinked tie-coat were made by the following method, based on the technique of Example 15.

A foam coating formulation was made by whisking a mixture of Polyfoam® VP-703 (resin+foaming agents, 200.0 g), Polyresin MFB (MF resin, 6.0 g) and PP-Crosslinker VP-760 (blocked isocyanate crosslinker, all Polycoating, 6.0 g) to a density of 225 g/l using a Banbury stainless steel laboratory mixer. The foam coating formulation was applied to the woven polyamide fabric used in Example 15 by knife-over-roll and dried (70° C., 3 mins), then crushed (600 kPa pressure) between stainless steel rollers, and finally cured (170° C., 3 mins). Part of the base coated fabric was then coated with the 2-K coating formulation of Example 14 and the whole piece of fabric dried at 70° C. (3 mins).

A sample of fabric coated accordingly with 13 g/m$^2$ foamed base coat and 7 g/m$^2$ low-swell top coat gave a hydrostatic head resistance of over 20 kPa and water vapour resistance of 21 m$^2$ Pa/W (coating surface next to the 100% RH source). The water vapour resistance of the fabric coated with crushed and cured foam base coat only was 10 m$^2$ Pa/W (fabric side next to the 100% RH source) and 9 m$^2$ Pa/W (coating surface next to the 100% RH source). The $R_e$ of the crushed and cured foam layer is therefore about 7 m² Pa/W. Using this information, the theoretical $R_e$ for the coated fabric is approximately 20 m² Pa/W, assuming minimal penetration of low swell coat into the foam structure.

EXAMPLE 17

A film laminate with a 1-K low swell outer surface and foamed crosslinked adhesive layer was made by the following method.

A dried but not crushed or cured, foamed base coat was prepared using the fabric, coating formulation and method of Example 16. A fully-dried film (20 μm thick) prepared from the capped poly(urethane-urea) formulation of Example 7, was lightly nipped to the surface of the foam coating. The film laminate was then heated at 170° C. for 3 min to fully cure the foamed base coat, which acts as an adhesive.

A sample of fabric coated accordingly with 14 g/m² foamed base coat and laminated to a 20 g/m² low-swell top film gave a hydrostatic head resistance of over 20 kPa. The film laminate had measured water vapour resistances of 32 m² Pa/W (fabric side next to the 100% RH source) and 51 m²Pa/W (coating surface next to the 100% RH source). The water vapour resistance of the fabric coated with uncrushed and cured foam base coat only was 11 m² Pa/W (fabric side and coating surface next to the 100%RH source). The $R_e$ of the uncrushed and cured foam layer is therefore about 8 m² Pa/W. Using this information, the theoretical $R_e$ for the laminate is 31 m² Pa/W.

Droplets of distilled water placed on the continuous surface of the film laminate showed no propensity to wet out, or to cause wrinkling or swelling of the polymer layer during an observation period of 4 h.

COMPARATIVE EXAMPLE 18

A homologous series of PEO-based polyurethane films with an initial NCO/OH index of 2.5 was made by the following method.

A prepolymer was prepared by intimately mixing poly(ethylene glycol) of average mw 600 (PEG with n=13, Polyglycol® 600—Clariant, 150.0 g) and 4,4'-diisocyanatodiphenylmethane (MDI, Desmodur® 44M flake—Bayer, 156.3 g) at 60° C. for 2h, and was then allowed to cool to room temperature. The stoichiometric amount of butan-1,4-diol (33.8 g) was added to the prepolymer, and the mixture poured into a steel mould sprayed with release agent and heated at 100° C. for 2 h. The resultant hydrophilic polyurethane was dissolved in DMF (30% solids) and portions (ca 50 g) cast onto glass plates. Fully dried films of this polyurethane had a PEO content of 44% w/w, tensile strength of 10 MPa, 100% modulus of 4 MPa, elongation at break of 750%, Shore A hardness of 90, water uptake of 55% w/w and 15% volume swelling.

This preparation was repeated using poly(ethylene glycols) of average mw 1000, 1500 and 2000. The water uptake and hence the water:ether oxygen ratio of each film was then measured under equilibrium swelling conditions, Table 2.

TABLE 2

Water Uptake of Increasingly Hydrophilic Polyurethanes (Example 18)

| PEG mw of polymer | n value | PEO Content (% w/w) | Hardness (Shore A) | Water Uptake (% w/w, 21° C.) | Maximum Water:EO Ratio (21° C.) |
|---|---|---|---|---|---|
| 600 | 13 | 44 | 90 | 18 | 1.00 |
| 1000 | 22 | 54 | 67 | 55 | 2.49 |
| 1500 | 33 | 66 | 37 | 119 | 4.41 |
| 2000 | 44 | 72 | 18 | 191 | 6.49 |

These results clearly illustrate the excessively high water absorption characteristics of hydrophilic polyurethanes with progressively increasing PEO content and chain length (or n), when compared with the low swell poly(urethane-urea)s of the present invention.

The invention claimed is:

1. A poly(urethane-urea) comprising segments derived from
   (a) a diisocyariate or mixture of diisocyanates;
   (b) a polyether polyol comprising repeating units of general formula —[(CH$_2$)$_m$O]— wherein each m is the same or different and is 3 or 4, or a mixture of said polyether polyols; and
   (c) a diamine or mixture of diamines,
   wherein said polyether polyol segment(s) (b) make up at least 70% by weight of the dry poly(urethane-urea) and wherein the ether oxygen atoms of said polyether polyol segment(s) (b) make up at least 15% by weight of the dry poly(urethane-urea); and wherein said poly(urethane-urea) has an amine end group content of up to 0.2% by weight.

2. A poly(urethane-urea) according to claim 1 which comprises at least 80% by weight of polyether polyol segments.

3. A poly(urethane-urea) according to claim 1 wherein said polyether polyol segment(s) (b) are of formula —[(CH$_2$)$_m$O]$_n$— wherein each m is the same or different and is 3 or 4 and n represents the average number of ether monomer units in the segment and is an integer of from 10 to 70.

4. A poly(urethane-urea) according to claim 3 wherein m is 3 and n is from 35 to 55.

5. A poly(urethane-urea) according to claim 3 wherein m is 4 and n is from 25 to 45.

6. A poly(urethane-urea) according to claim 1, which comprises from 15 to 25% by weight of ether oxygen atoms.

7. A poly(urethane-urea) according to claim 1 having an amine end group content of from 0.005 to 0.15% by weight.

8. A poly(urethane-urea) according to claim 1 having an amine end group content of substantially zero.

9. A poly(urethane-urea) composition comprising a poly(urethane-urea) as claimed in claim 1 and a solvent.

10. A composition according to claim 9 having a solids content of from 10 to 50% by weight.

11. A composition according to claim 9 having a viscosity of from 100 to 500 poise.

12. A composition according to claim 9 which is a one component composition having capped amine end groups and an amine end group content of substantially zero.

13. A composition according to claim 9 additionally comprising one or more crosslinkers.

14. A composition according to claim 13 where the crosslinker is a melamine-formaldehyde precondensate.

15. A composition according to claim 13 where the crosslinker is a blocked isocyanate.

16. A composition according to claim 15 containing from 5 to 20% blocked isocyanate based on the dry weight of polymer.

17. A composition according to claim 15, wherein the blocked isocyanate is an isocyanate blocked with a blocking agent selected from alcohols caprolactams, phenols, oximes, pyrazoles and malonates.

18. A composition according to claim 17 wherein the blocked isocyanate is an isocyanate blocked with 3,5-dimethylpyrazole or diethyl malonate or a combination thereof.

19. A composition according to claim 9 further comprising one or more additives selected from anti-oxidants, uv stabilizers, matting agents, and pigments.

20. A composition according to claim 19 comprising from 10 to 20% matting agent based on the dry weight of polymer.

21. A composition according to claim 19 where the matting agent is silica with a particle size of from 2 to 5 microns.

22. A film comprising a poly(urethane-urea) as claimed in claim 1, optionally on a removable release substrate.

23. A coated material having a coating comprising a poly(urethane-urea) as claimed in claim 1.

24. A coated material according to claim 2, wherein the material is a textile and the coating comprises a first coated layer or film layer comprising said poly(urethane-urea) and optionally one or more further coated layers and/or film layers.

25. A coated material according to claim 24, wherein the first coated layer is the outer layer.

26. An article of clothing or footwear, a tent, bivouac bag, protective blanket, mattress cover, bed sheet, seat cover, wound dressing or drape comprising a coated material as claimed in claim 24.

27. A process for producing (i) a film comprising a poly(urethane-urea) as claimed in claim 1, optionally on a removable release substrate, or (ii) a coated material having a coating comprising a poly(urethane-urea) as claimed in claim 1, which process comprises applying a composition comprising a poly(urethane-urea) as claimed in claim 1 and a solvent to a material or release substrate, removing the solvent, optionally curing the poly(urethane-urea) and optionally removing the release substrate.

28. A process for producing (i) a film comprising a poly(urethane-urea) as claimed in claim 1, optionally on a removable release substrate, or (ii) a coated material having a coating comprising a polyurethane-urea) as claimed in claim 1, which process comprises applying a composition to a material or release substrate, removing the solvent, optionally curing the poly(urethane-urea) and optionally removing the release substrate, wherein said composition is obtained or obtainable by polymerizing
(a) a diisocyanate or a mixture of diisocyanates;
(b) a polyether polyol comprising repeating units of general formula wherein each m is the same or different and is 3 or 4, or a mixture of said polyether polyols; and
(c) a diamine or a mixture of diaminesin a solvent and optionally adding one or more crosslinkers and/or one or more additives selected from anti-oxidants, uv stabilizers, matting agents and pigments.

29. A process for producing a coated material having a coating comprising a poly(urethane-urea) as claimed in claim 1, which process comprises (a) bonding a film comprising a poly(urethane-urea) as claimed in claim 1 optionally on a removable release substrate to a material using an adhesive layer, and (b) optionally removing the release substrate, said steps (a) and (b) being carried out in either order.

30. A film or coated material obtained or obtainable by the process of claim 27.

31. A film or coated material obtained or obtainable by the process of claim 28.

32. A coated material obtained or obtainable by the process of claim 29.

33. An article of clothing or footwear, a tent, bivouac bag, protective blanket, mattress cover, bed sheet, seat cover, wound dressing or drape comprising a coated material as claimed in claim 30.

34. An article of clothing or footwear, a tent, bivouac bag, protective blanket, mattress-cover, bed sheet, seat cover, wound dressing or, drape comprising a coated material as claimed in claim 31.

35. An article of clothing or footwear, a tent, bivouac bag, protective blanket, mattress cover, bed sheet, seat cover, wound dressing or drape comprising, a coated material as claimed in claim 32.

36. A multi-layer film having a first film layer comprising a poly(urethane-urea) as claimed in claim 1 and one or more further layers, optionally on a removable release substrate.

37. A film according to claim 36, wherein the first film layer is the outer layer.

* * * * *